(12) United States Patent
Yuriyama et al.

(10) Patent No.: US 7,478,244 B2
(45) Date of Patent: Jan. 13, 2009

(54) ACCESS CONTROL METHOD

(75) Inventors: Madoka Yuriyama, Fujisawa (JP); Yuji Watanabe, Setagaya-ku (JP); Masayuki Numao, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 669 days.

(21) Appl. No.: 11/000,790

(22) Filed: Dec. 1, 2004

(65) Prior Publication Data

US 2005/0144460 A1     Jun. 30, 2005

(30) Foreign Application Priority Data

Dec. 24, 2003 (JP) ............................. 2003-426485

(51) Int. Cl.
*H04K 1/00* (2006.01)
*H04L 9/00* (2006.01)
(52) U.S. Cl. .................. 713/182; 713/193; 726/2; 726/27; 707/1; 707/9
(58) Field of Classification Search ............. 726/27
See application file for complete search history.

(56) References Cited

U.S. PATENT DOCUMENTS

| | | | | |
|---|---|---|---|---|
| 2001/0023421 A1* | 9/2001 | Numao et al. | ................. | 707/9 |
| 2002/0111845 A1* | 8/2002 | Chong | ........................ | 705/8 |
| 2002/0169965 A1* | 11/2002 | Hale et al. | ................. | 713/182 |

FOREIGN PATENT DOCUMENTS

| | | |
|---|---|---|
| JP | 2006043409 | 10/1995 |
| JP | 2003108440 | 4/2003 |

OTHER PUBLICATIONS

W3C: The Platform for Privacy Preferences 1.0 (P3P1.0) Specification, W3C Recommendation Apr. 16, 2003, http://www.w3.org/TR/2002/REC-P3P-20020416/, http://www.w3.org/TR/2002/REC-P3P.
Hirotsugu Kinoshita and Shigeo Tsujii, On Information Security of Database Networks, The Institute of Electronics, Information and Communication Engineers, dated Jan. 25, 1990, vol. J73-D-I No. 1, Japan.

* cited by examiner

*Primary Examiner*—Emmanuel L Moise
*Assistant Examiner*—Shewaye Gelagay
(74) *Attorney, Agent, or Firm*—Shimokaji & Associates, Inc.

(57) ABSTRACT

Effective utilization of a database while protecting a data provider's privacy is accomplished by an access control system which controls access to a database in which open information and secret information about a data provider are stored while being related to each other has an output request acquisition section which obtains an output request for output of information generated by accessing the database, a plural-term output authorization section which prohibits output of information generated by combining the open information and the secret information in output information requested to be output according to the output request, and which permits output of information generated by using the secret information without using the open information, and an output section which outputs the information in the output information permitted by the plural-term output authorization section to be output.

1 Claim, 15 Drawing Sheets (a)

200

| EMPLOYEE TABLE | | | |
|---|---|---|---|
| ID | NAME | MANAGERID | ... |
| 001 | AA | 023 | ... |
| 002 | BB | 023 | ... |
| 003 | CC | 065 | ... |
| ... | ... | ... | ... |

(b)

200

| MONEY TABLE | | | |
|---|---|---|---|
| NO | SALARY | SAVING | ... |
| 001 | XX HUNDRED THOUSAND YEN | YY HUNDRED THOUSAND YEN | ... |
| 002 | ZZ HUNDRED THOUSAND YEN | WW HUNDRED THOUSAND YEN | ... |
| 003 | VV HUNDRED THOUSAND YEN | KK HUNDRED THOUSAND YEN | ... |
| ... | ... | ... | ... |

FIGURE 2

| ID | COLUMN NAME | DB COLUMN NAME | KEY COLUMN | RELATED COLUMN <INPUT COLUMN> |
|---|---|---|---|---|
| ID1 | ID | EMPINFODB.EMPLOYEE.ID | ID1 | ID1 |
| ID2 | NAME | EMPINFODB.EMPLOYEE.NAME | ID1 | ID2 |
| ID3 | — | | ID1 | ID3<ID4> |
| ID4 | Y.NAME | EMPINFODB.EMPLOYEE.NAME | ID6 | ID3 |
| ID5 | X.MID | EMPINFODB.EMPLOYEE.MANAGERID | ID1 | ID1, ID2 |
| ID6 | Y.ID | EMPINFODB.EMPLOYEE.ID | ID6 | ID3 |
| ID7 | X.MONEY | | ID1 | ID1, ID2<ID8, ID9> |
| ID8 | M.SAVING | EMPINFODB.MONEY.SAVING | ID1 | ID1, ID2 |
| ID9 | M.SALARY | EMPINFODB.MONEY.SALARY | ID1 | ID1, ID2 |

(Final access column: RELATED COLUMN <INPUT COLUMN>)

FIGURE 8

| ID | COLUMN NAME | DB COLUMN NAME | KEY COLUMN | RELATED COLUMN (SENSITIVITY) |
|---|---|---|---|---|
| ID1 | ID | EMPINFODB.EMPLOYEE.ID | ID1 | ID1 (10) |
| ID2 | NAME | EMPINFODB.EMPLOYEE.NAME | ID1 | ID2 (10) |
| ID3 | — | | ID1 | ID3 (10) |
| ID4 | Y.NAME | EMPINFODB.EMPLOYEE.NAME | ID6 | ID3 (2) |
| ID5 | X.MID | EMPINFODB.EMPLOYEE.MANAGERID | ID1 | ID1 (7), ID2 (7) |
| ID6 | Y.ID | EMPINFODB.EMPLOYEE.ID | ID6 | ID3 (7) |
| ID7 | X.MONEY | | ID1 | ID1 (6), ID2 (6) |
| ID8 | M.SAVING | EMPINFODB.MONEY.SAVING | ID1 | ID1 (6), ID2 (6) |
| ID9 | M.SALARY | EMPINFODB.MONEY.SALARY | ID1 | ID1 (6), ID2 (6) |

| DB COLUMN NAME | COLUMN CLASSIFICATION |
|---|---|
| EMPINFODB.EMPLOYEE.ID | OTHERS |
| EMPINFODB.EMPLOYEE.NAME | PII |
| EMPINFODB.EMPLOYEE.MANAGERID | OTHERS |
| EMPINFODB.MONEY.NO | OTHERS |
| EMPINFODB.MONEY.SALARY | PSI |
| EMPINFODB.MONEY.SAVING | PSI |
| . . . | . . . |

FIGURE 10

| ID | COLUMN NAME | DB COLUMN NAME | KEY COLUMN | RELATED COLUMN (SENSITIVITY) | CLASSIFICATION |
|---|---|---|---|---|---|
| ID1 | ID | EMPINFODB.EMPLOYEE.ID | ID1 | ID1 (10) | OTHERS |
| ID2 | NAME | EMPINFODB.EMPLOYEE.NAME | ID1 | ID2 (10) | PII |
| ID3 | - | | ID1 | ID3 (10) | |
| ID4 | Y.NAME | EMPINFODB.EMPLOYEE.NAME | ID6 | ID3 (2) | PII |
| ID5 | X.MID | EMPINFODB.EMPLOYEE.MANAGERID | ID1 | ID1 (7), ID2 (7) | OTHERS |
| ID6 | Y.ID | EMPINFODB.EMPLOYEE.ID | ID6 | ID3 (7) | OTHERS |
| ID7 | X.MONEY | | ID1 | ID1 (6), ID2 (6) | |
| ID8 | M.SAVING | EMPINFODB.MONEY.SAVING | ID1 | ID1 (6), ID2 (6) | PSI |
| ID9 | M.SALARY | EMPINFODB.MONEY.SALARY | ID1 | ID1 (6), ID2 (6) | PSI |

FIGURE 11

| ID | COLUMN NAME | DB COLUMN NAME | KEY COLUMN | RELATED COLUMN (SENSITIVITY) | CLASSIFICATION | EVALUATION |
|---|---|---|---|---|---|---|
| ID1 | ID | EMPINFODB.EMPLOYEE.ID | ID1 | ID1 (10) | OTHERS | |
| ID2 | NAME | EMPINFODB.EMPLOYEE.NAME | ID1 | ID2 (10) | PII | OK |
| ID3 | - | | ID1 | ID3 (10) | | OK |
| ID5 | X.MID | EMPINFODB.EMPLOYEE.MANAGERID | ID1 | ID1 (7), ID2 (7) | OTHERS | |
| ID6 | Y.ID | EMPINFODB.EMPLOYEE.ID | ID6 | ID3 (7) | OTHERS | |
| ID7 | X.MONEY | | ID1 | ID1 (6), ID2 (6) | | NG |
| ID8 | M.SAVING | EMPINFODB.MONEY.SAVING | ID1 | ID1 (6), ID2 (6) | PSI | NG |
| ID9 | M.SALARY | EMPINFODB.MONEY.SALARY | ID1 | ID1 (6), ID2 (6) | PSI | NG |

FIGURE 13

ACCESS CONTROL METHOD

FIELD OF THE INVENTION

The present invention relates to a database access control system, an access control device, an access control method, a program, and a recording medium. More particularly, the present invention relates to an access control system, device and method which prevent leakage of personal information or the like from a database and to a relating program and recording medium.

BACKGROUND ART

In recent years, with the widespread use of computer networks and the WWW system, companies have widely put forth schemes to construct databases by collecting information relating to the privacy of individuals. The method of recording collected information in a data structure in the form of a table has generally been practiced in order to efficiently manage the collected information. This method enables a user to easily and conveniently select information from a data base by designating a condition by using SQL (Structured Query Language) for example.

A technique of limiting access with respect to each of items in tables in a database as well as limiting access to each of the tables has been used (see Japanese Published Unexamined Patent Application No. 2002-269092). In the technique described in Japanese Published Unexamined Patent Application No. 2002-269092, determination as to whether or not reference to or change of each of items in a database is permitted can be made according to the right of a person who accesses the database. In a system constructed in accordance with "Tivoli Privacy Manager Ver. 1.1" from IBM Corporation, access control is performed with respect to each of items in a table on the basis the privacy policy described in "The platform for Privacy Preferences (P3P) 1.0 Specification" home page URL "http://www.w3.org/TR/P3P", 2002.

More specifically, in this system, determination as to whether or not a user who wishes to access a column is permitted to access the column is made on the basis of the identification of the user, an access purpose and a set of owners of information in the column. Further, in this system, access control can be performed according to attributes of an owner of information, such as, the age of the owner, whether or not the owner consents to use of the information (sending of direct mail for example) or whether or not the owner consents to a prescribed privacy policy.

Information generally called personal information includes PII (Personal Identifiable Information) and PSI (Privacy Sensitive Information). PII is information for identification of a person, e.g., a name or an electronic mail address. PSI infringes the privacy of a person when output while being related to PII. PSI is, for example, information on an annual income, etc. To prevent infringement on privacy, it is necessary to prohibit outputting PII and PSI by relating PII and PSI to each other. It is desirable to permit output of PSI alone since the probability that PSI alone will not infringe privacy is high.

To use a database as effectively as possible while suitably protecting privacy as described above, it is necessary to perform determination as to permission/denial of access in such a manner that permission/denial of access with respect to a plurality of columns is determined on the basis of the mutual relationship between the columns. Each of the above-described arts enables determination as to permission/prohibition of each of columns in a database, but does not enable determination as to permission/prohibition of acquisition of data defined as a combination of a plurality of columns.

It is, therefore, an object of the present invention to provide an access control system, an access control device, an access control method, a program and a recording medium capable of solving the above-described problem. This object can be attained by a combination of features described in the independent claims in the appended claims. In the dependent claims, further advantageous examples of the present invention are specified.

SUMMARY OF THE INVENTION

To achieve the above-described object, according to first aspect of the present invention, there is provided an access control system which controls access to a database in which open information and secret information about a data provider are stored while being related to each other, the access control system having an output request acquisition section which obtains an output request for output of information generated by accessing the database, a plural-term output authorization section which prohibits output of information generated by combining the open information and the secret information in output information requested to be output according to the output request, and which permits output of information generated by using the secret information without using the open information, and an output section which outputs the information in the output information permitted by the plural-term output authorization section to be output, an access control device, an access control method of controlling access to a database by means of the access control system, a program for controlling the access control system, and a recording medium on which the program is recorded.

In the summary of the present invention, not all the necessary features of the invention are listed. Subcombinations of the features can constitute the present invention.

According to the present invention, a database can be effectively used while protecting a data provider's privacy.

BRIEF DESCRIPTION OF THE DRAWINGS

FIG. 2 shows an example of the data structure of database 200;

FIG. 8 shows the results of an analysis made by the sensitivity computation section 420 using DB schema 415 on columns to be accessed according to output request 30;

FIG. 9 shows the results of computation of the sensitivity performed by sensitivity computation section 420;

FIG. 10 shows an example of column classification data 445;

FIG. 11 shows the results of classification of each column into open information or secret information performed by decision object determination section 440;

FIG. 13 shows the results of evaluation made by access authorization device 120 as to permission/prohibition of output of information;

PREFERRED EMBODIMENT

The present invention will be described with respect to an embodiment thereof. The embodiment described below, however, is not limiting of the invention set forth in the appended claims, and all combinations of features described in the description of the embodiment are not necessarily indispensable to the solution according to the present invention.

Figure 1:
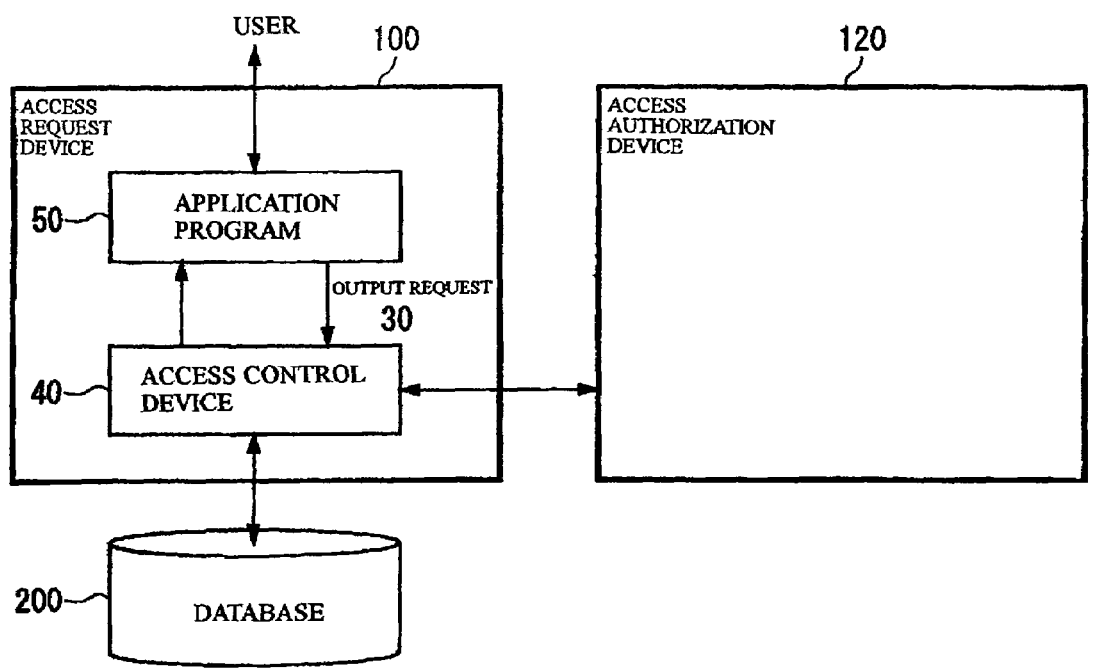
FIG. 1 shows the outline of access control system 100.

FIG. 1 shows the outline of an access control system 10. The access control system 10 has an access request device 100, an access authorization device 120 and a database 200. In the database 200, open information about data providers, e.g., personal identifiable information for identification of data providers and secret information about data providers, e.g., privacy information are stored in a state of being related to each other. The access authorization device 120 prohibits the access request device 100 from obtaining personal identifiable information and privacy information from the database 200 by relating them to each other, and permits the access request device 100 to obtain only the privacy information. The system is thus arranged to enable effective use of the database while protecting the privacy of data providers.

The access request device 100 includes an application program 50 and an access control device 40. The application program 50 accepts an operation from a user and sends to the access control device 40 an output request 30 for requesting output of information generated by accessing the database 200. When the access control device 40 receives from output request 30 from the application program 50, it inquires the access authorization device 120 whether or not it is permitted to output information according to output request 30. The access control device 40 generates, by accessing the database 200, information permitted by the access authorization device 120 to be output in output information requested by means of output request 30 to be output, and outputs the generated information to the user through the application program 50.

FIG. 2 shows an example of the data structure of the database 200. The database 200 has an EMPLOYEE table shown in (a) and a MONEY table shown in (b). The EMPLOYEE table includes an ID column in which numbers for identification of employees are stored, a NAME column in which names of the employees are stored, and MANAGER ID column in which numbers for identification of managers of the employees. In the EMPLOYEE table, the identification number for each of the employees who are an example of data providers, the number of the employee, the name of the employee and the identification number for the manager of the employee are stored while being related to each other. Data providers are individuals identified from personal information indicated by data, e.g., those referred to as data owners. In the following description, obtaining any of information items in a column is expressed as access to the column.

The MONEY table includes a NO column in which identification numbers for the employees are stored, a SAL-ARY column in which annual incomes of the employees are stored and a SAVING column in which the employees' savings are stored. In the MONEY table, the identification number for each of the employees, the annual income of the employee, and the employee's saving are stored while being related to each other. The name of each employee is employee identifiable information for identification of the employee and is an example of open information about the employee. Each of the annual income and saving of the employee is privacy information. Outputting of this information item in a state of being related to the name of the employee infringes the employee's privacy. The annual income and saving are an example of secret information about the employee. Thus, in the database 200, open information and secret information about a plurality of employees are stored while being related to each other.

Figure 3:
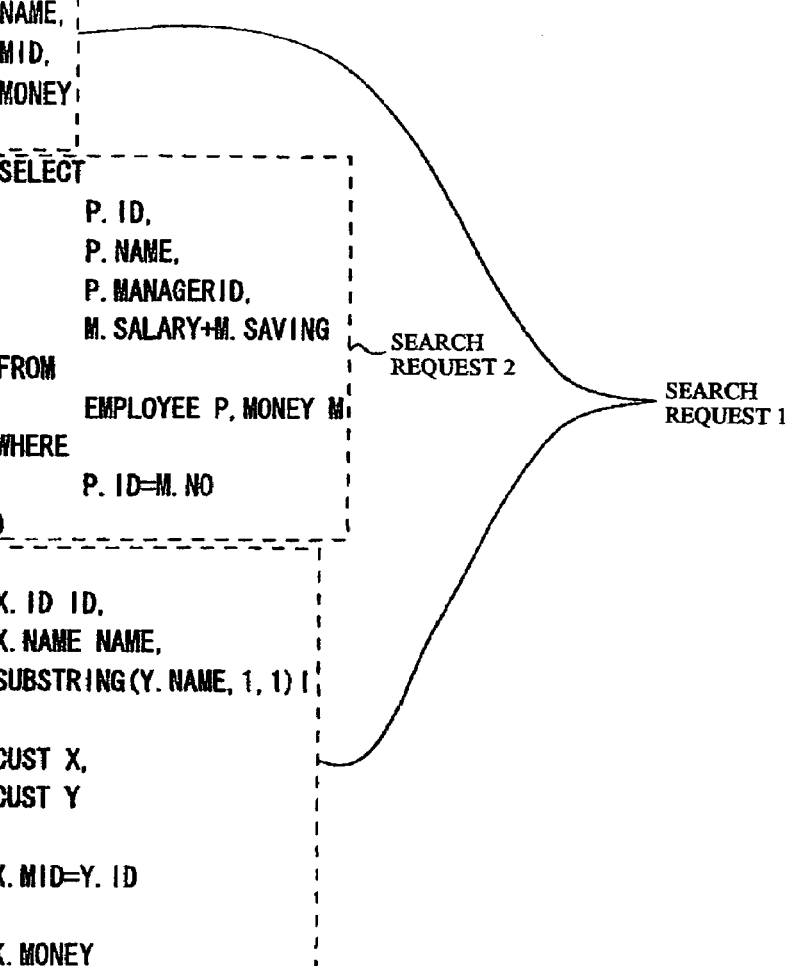
FIG. 3 shows an example of output request 30.

FIG. 3 shows an example of output request 30. Output request 30 is represented by a program described in SQL or XQuery, and includes a search request 2 formed of commands in the seventh to sixteenth lines and a search request 1 formed of commands in the first to sixth lines and in the seventeenth to twenty-seventh lines. Search request 2 is a request to access the EMPLOYEE table and MONEY table and generate a new CUST table in which the identification number for each employee, the name of the employee, the identification number for the manager of the employee, and the annual income and the total of the employee's savings are related to each other. Search request 1 is a request to form, by using the CUST table, a table in which the identification number for each employee, the name of the employee and the initial of the manager of the employee are related to each other, and to output the table after rearranging the rows in the table in the order from the smallest to the largest of the sums of the annual incomes and savings of the employees.

Figure 4:
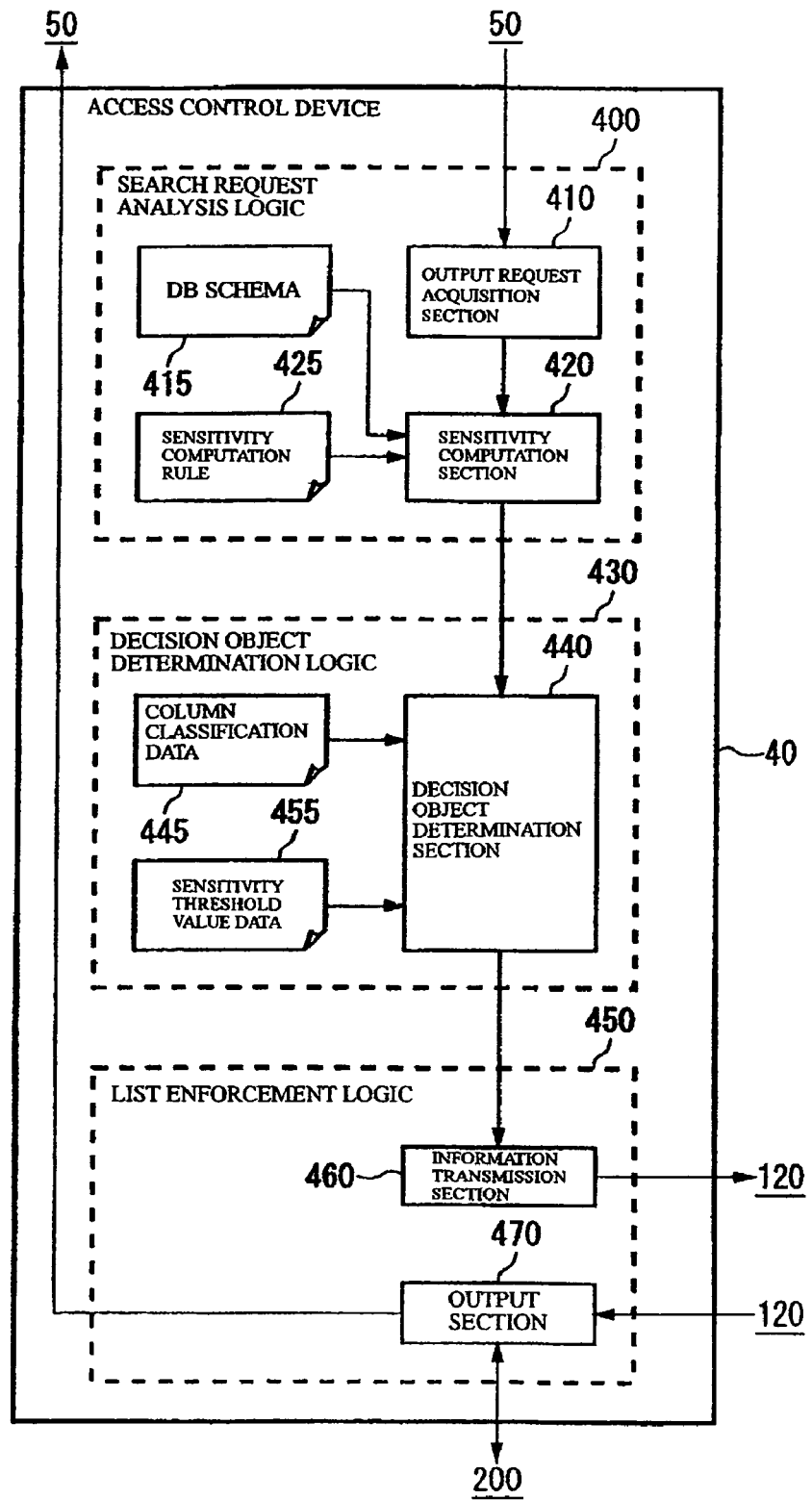
FIG. 4 is a functional block diagram of access control device 40.

The functions of the access control device 40 will be described with reference to FIGS. 4 to 11. FIG. 4 is a functional block diagram of the access control device 40. The access control device 40 has a search request analysis logic 400, a decision object determination logic 430 and a list enforcement logic 450. The search request analysis logic 400 has an output request acquisition section 410 and a sensitivity computation section 420. The output request acquisition section 410 obtains output request 30 from the application program 50. The output request acquisition section 410 divides each search request in the obtained output request 30 into an output portion indicating information requested to be output, an output determination portion indicating a condition for selection of an output, and a sequence designation portion indicating an output sequence.

Figure 5:
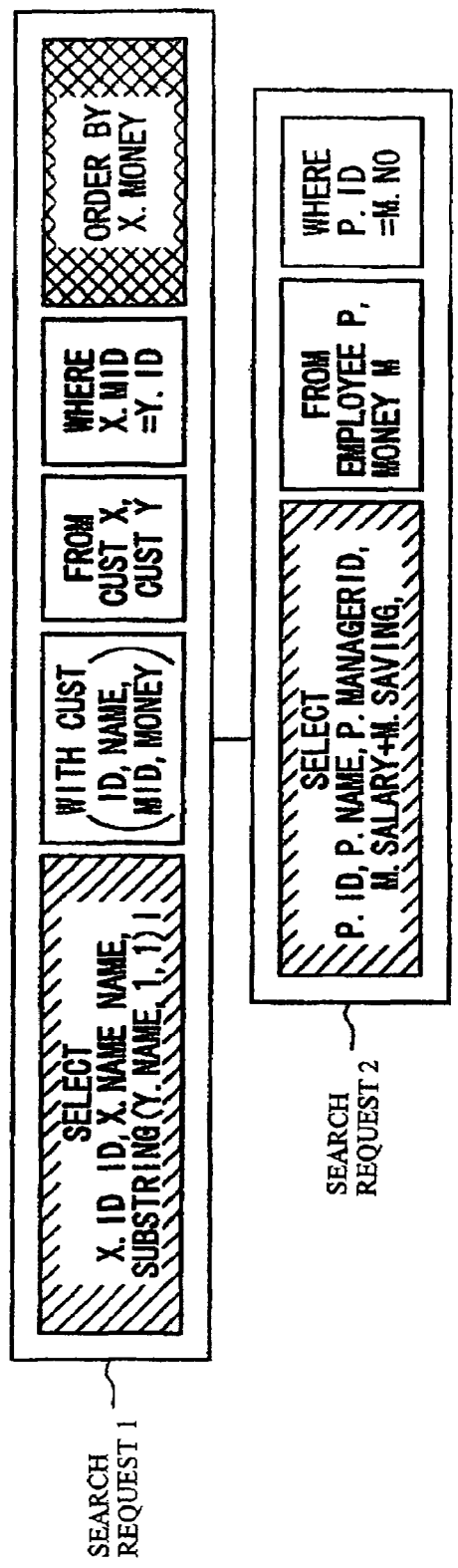
FIG. 5 shows an output portion, an output determination portion and a sequence designation portion of output request 30 obtained as a result of division of output request 30 performed by the output request acquisition section 410.

FIG. 5 shows an output portion, an output determination portion and a sequence designation portion of output request 30 obtained as a result of division of output request 30 performed by the output request acquisition section 410. In this figure, the output portion is indicated by a hatched area, the output determination portion by a white ground portion, and the sequence designation portion by a double-hatched portion. For example, s SELECT command is an output portion because it is for request of output of information selected from the database 200. A WHERE command is an output determination portion because it designates a condition to be satisfied by selected information. An ORDER BY command is a sequence designation portion because it designates a rearrangement of information.

Subsequently, the sensitivity computation section 420 performs processing described below in order to compute the sensitivity of secret information and open information of data providers with respect to the generation of output information. First, the sensitivity computation section 420 detects a pair of columns in a mutually identical relationship and a pair of columns in an influential relationship with respect to each of columns requested to be output according to output request 30.

Figure 6:
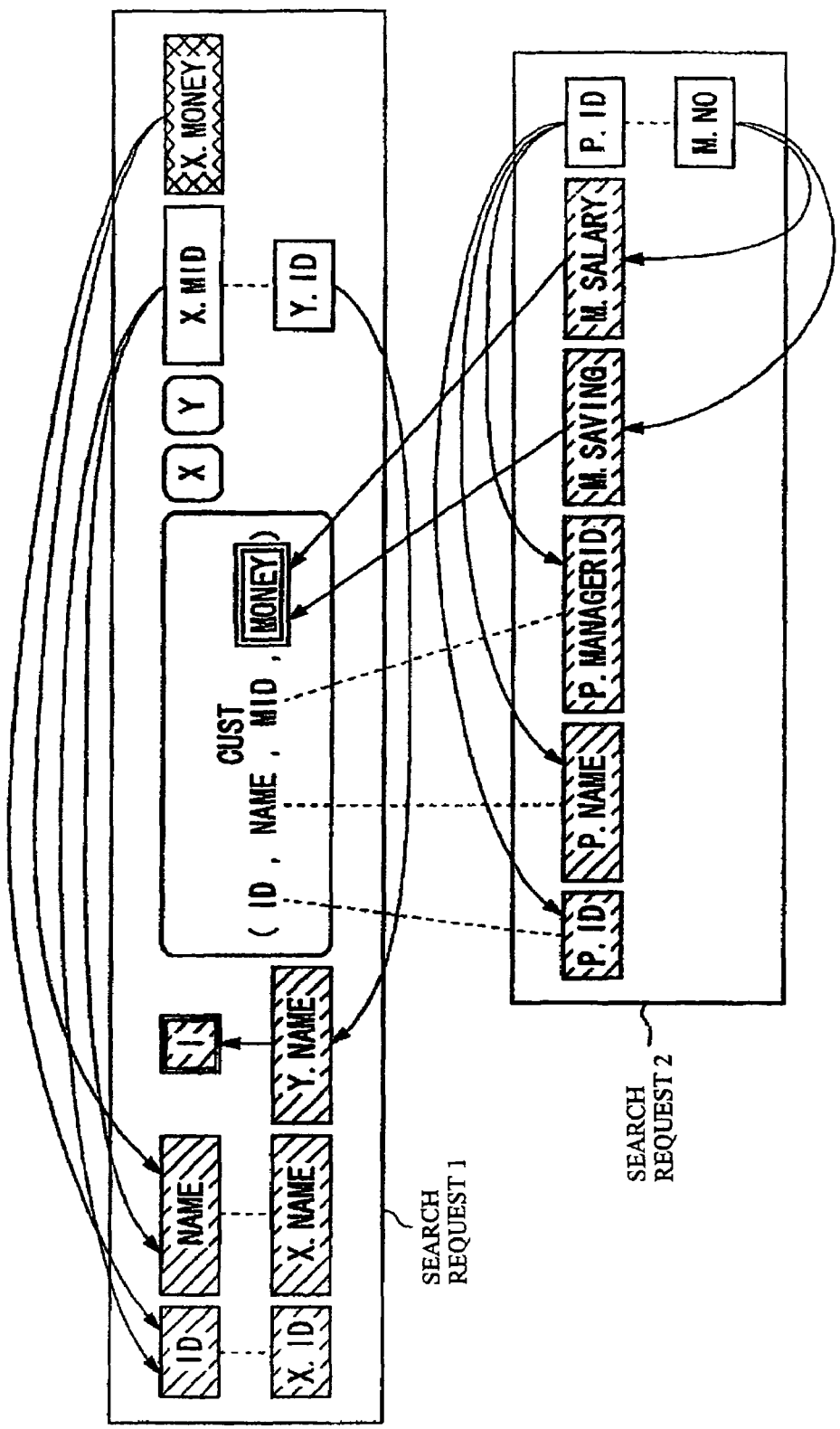
FIG. 6 shows the results of detection of pairs of columns in a mutually identical relationship and pairs of columns in an influential relationship such that one of the columns influences the other, performed sensitivity computation section 420 with respect to the columns requested to be accessed according to output request 30.

FIG. 6 shows the results of detection of pairs of columns in a mutually identical relationship and pairs of columns in an influential relationship such that one of the columns influences the other, performed the sensitivity computation section 420 with respect to the columns requested to be accessed according to output request 30. In this figure, each rectangular area represents a column, and a rectangular area in a double-line flame represents a function column which is not included in the database 200, and which is newly generated according to output request 30. A rectangular area rounded at corners a table requested to be accessed according to output request 30. An output portion is indicated by a hatched area, an output determination portion by a white ground portion, and a sequence designation portion by a double-hatched portion, as are those in FIG. 5.

The sensitivity computation section 420 detects identical columns or tables accessed under different names according to output request 30. For example, a dotted line in the figure indicates a pair of columns in an identical relationship. For example, columns indicated by ID and X. ID in search request 1 represents the ID column in the EMPLOYEE table and are, therefore, identical to each other. Also, the sensitivity computation section 420 performs detection as to whether which output portion is influenced by an output determination portion and a sequence designation portion, and also performs detection as to which column is input to a function column. For example, a solid line in the figure indicates a pair of columns in such a relationship that one of the columns influences the other. For example, M. SAVING and M. SALARY are inputs to the function column MONEY in search request 1 and therefore influence MONEY.

Subsequently, the sensitivity computation section 420 performs, by using a DB schema 415, analysis as to which column in the database 200 corresponds to each of columns required to be accessed according to output request 30.

Figure 7:
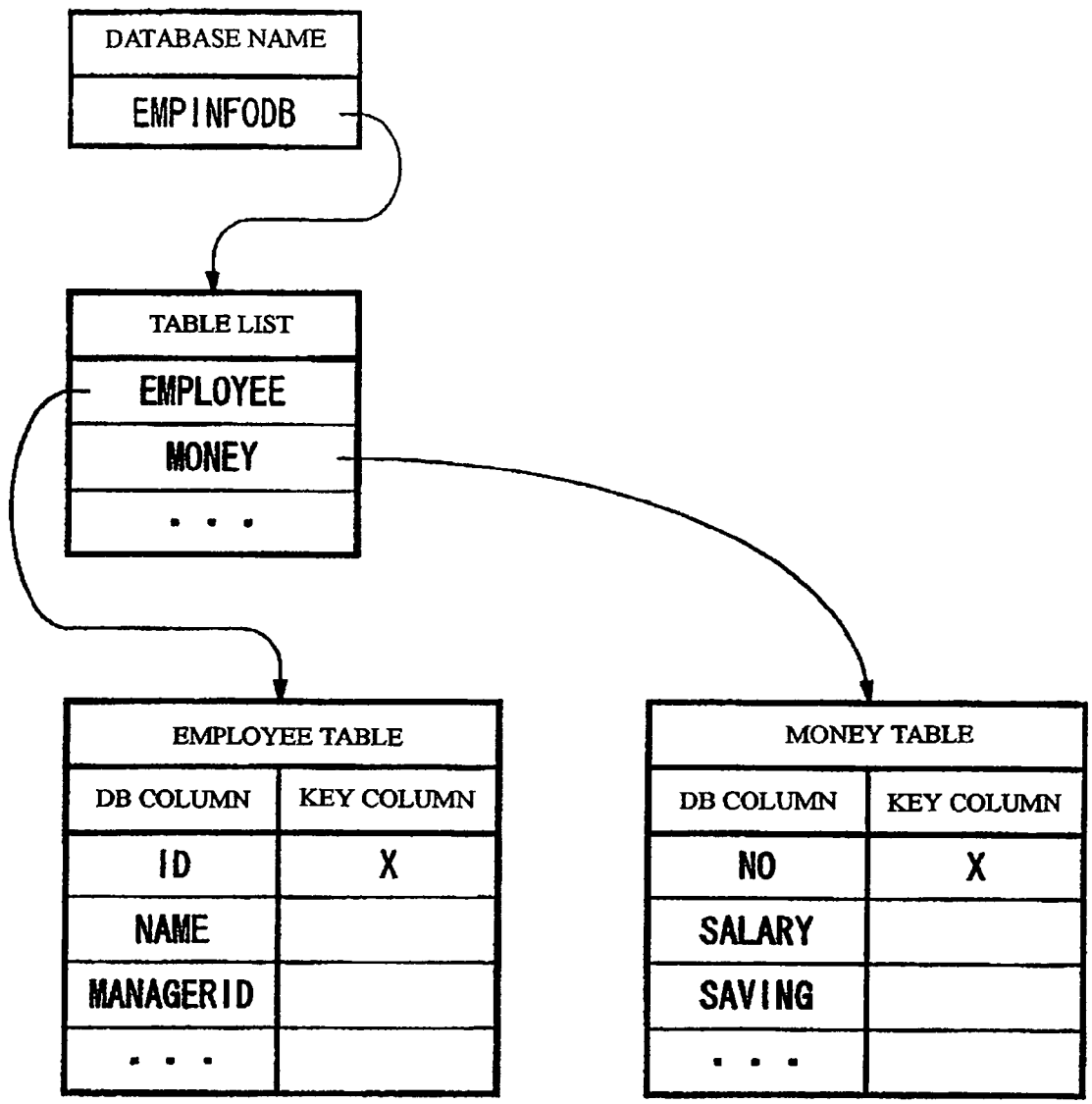
FIG. 7 shows an example of DB schema 415.

FIG. 7 shows an example of DB schema 415. DB schema 415 represents the structure of the database 200. More specifically, DB schema 415 indicates that the name of the database 200 is EMPINFODB; EMPINFODB includes the EMPLOYEE table and the MONEY table; the EMPLOYEE table includes the ID column, the NAME column and the MANAGERID column; and the MONEY table includes the NO column, the SALARY column and the SAVING column.

The DB schema 415 also indicates that the ID column in the EMPLOYEE table is a key column for identification of the owners of information stored in the EMPLOYEE table. Similarly, the DB schema 415 indicates that the NO column in the MONEY table is a key column of the MONEY table. The access control device 40 can perform access control differently with respect to data owners by identifying the data owners from the values in the key column.

FIG. 8 shows the results of an analysis made by the sensitivity computation section 420 using DB schema 415 on columns to be accessed according to output request 30. In this figure, the analysis results are shown as a table in which the names of columns used according to output request 30 and the columns in the database 200 referred to under the names are related to each other. In this figure are also shown, with respect to each column, the key column in the table in which the column is included and a related column which has the corresponding key column in common with the column, and which is influenced by the column in output request 30. Each column used in output request 30 are assigned identification numbers from ID1 to ID9 for convenience' sake. In the following description, the column assigned ID1 is referred to as ID1 column and the columns assigned ID2 to ID9 are similarly referred to as 1D2 to ID9 columns.

More specifically, the column to be accessed as Y. NAME according to output request 30 is the NAME column of the EMPLOYEE table in the database EMPINFODB in the database 200. The key column in the table in which this column is included is ID6 column Y. ID. Further, this column influences the output of the function column I. Therefore, a column related to this column is the ID3 column I. The ID1 to ID3 columns are finally accessed columns used as output information requested to be output according to output request 30.

The sensitivity computation section 420 computes on the basis of a sensitivity computation rule 425 the sensitivity to which each column influences the generation of output information. In the following description, the sensitivity to which information in a column influences output information is referred to as the sensitivity of the column.

FIG. 9 shows the results of computation of the sensitivity performed by the sensitivity computation section 420. More specifically, in a case where output information includes secret information or open information, the sensitivity computation section 420 computes a higher sensitivity in comparison with a case where a conditional decision made to select output information from the database 200 includes secret information or open information. For example, the sensitivity computation section 420 computes 10 as the sensitivity to which open information included in output information influences the output information. On the other hand, the sensitivity computation section 420 computes 7 lower than 10 as the sensitivity to which open information used for conditional decision made to determine output information, e.g., an internal column such as X. MID influences the output information.

In a case where output information includes secret information or open information, the sensitivity computation section 420 computes a higher sensitivity in comparison with a case where secret information or open information is used as a condition for rearrangement of the output sequence of output information. For example, the sensitivity computation section 420 computes 6 lower than 10 as the sensitivity to which secret information used as a condition for rearrangement of the output sequence of output information, e.g., an internal column such as X. MONEY influences the output information.

The sensitivity computation section 420 also computes the degrees of influence of columns $X_1$, $X_2$, x x x, $X_N$ input to a function column $Y=F(X_1, X_2, x x x, X_N)$ on the basis of the sensitivity of Y and the nature of the function F. For example, the sensitivity computation section 420 computes the sensitivity of column X with respect to a function column $Y=SUBSTRING (X, m, n)$ which uses a function SUBSTRING for picking up n letters from the mth letter in the letter string on the basis of the sensitivity of the function column Y and the nature of the function SUBSTRING.

More specifically, while ID4 column input to SUBSTRING indicates the names of employees, ID3 column output from SUBSTRING as output information according to output request 30 indicates only the initials of the employees. For example, if the average of the numbers of letters for the names of the employees is five, the sensitivity computation section 420 computes 2 as the sensitivity of the ID4 column by multiplying the sensitivity 10 of the ID3 column by the proportion of one letter, i.e., as the number of letters for the initials, in five letters, i.e., the number of letters for the names of the employees. That is, in the case of outputting a portion of open information or secret information as output information, the sensitivity computation section 420 computes the sensitivity of the open information or secret information on the basis of the proportion of the amount of the partial information output as output information in the amount of information of the open information or secret information.

Preferably, in functions other than the predetermined functions, the sensitivity computation section 420 determines the sensitivity of each column input to the function column as the same value as the sensitivity of the function column Y. In this manner, the sensitivity is estimated high in a case where details of processing for the function are unknown, thereby reducing the possibility of privacy leakage.

The decision object determination logic 430 includes a decision object determination section 440. The decision object determination section 440 selects, among the columns the degrees of influence of which have been computed by the sensitivity computation section 420, an object on which decision is made by the access authorization device 120 to permit access. More specifically, the decision object determination section 440 classifies the columns by using column classification data 445.

FIG. 10 shows an example of column classification data 445. As for column classification data 445, the names of the columns in the database 200 and a classification of the columns are stored. For example, column classification data 445 indicates that the NAME column in the EMPLOYEE table in the database EMPINFODB is classified into PII (Personal Identifiable Information), which is an example of open information. Column classification data 445 also indicates that the SALARY column in the MONEY table in the database EMPINFODB is classified into PSI (Privacy Sensitive Information), which is an example of secret information. Columns not classified into these categories are classified into "OTHERS" for convenience' sake.

FIG. 11 shows the results of classification of each column into open information or secret information performed by the decision object determination section 440. The decision object determination section 440 classifies the ID2 and ID4 columns into open information and classifies ID8 and ID9 information into secret information.

Subsequently, the decision object determination section 440 selects, on the basis of sensitivity threshold value data 455, the columns having degrees of influence equal to or higher than a predetermined reference as objects on which decision is made by the access authorization device 120 to permit access. For example, if sensitivity threshold value data 455 indicates that the predetermined reference is 6, the decision object determination section 440 selects the ID1 to ID3 columns and ID5 to ID9 columns as objects on which decision is made by the access authorization device 120 to permit access, and permits access to the ID4 column.

The list enforcement logic 450 includes an information transmission section 460 and an output section 470. The information transmission section 460 transmits to the access authorization device 120 the groups of columns selected by the decision object determination section 440 and having degrees of influence equal to or higher than the predetermined reference. The output section 470 obtains from the database 200 the information permitted by the access authorization device 120 to be output in the output information requested to be output according to output request 30, and outputs the obtained information to the application program 50.

Figure 12:
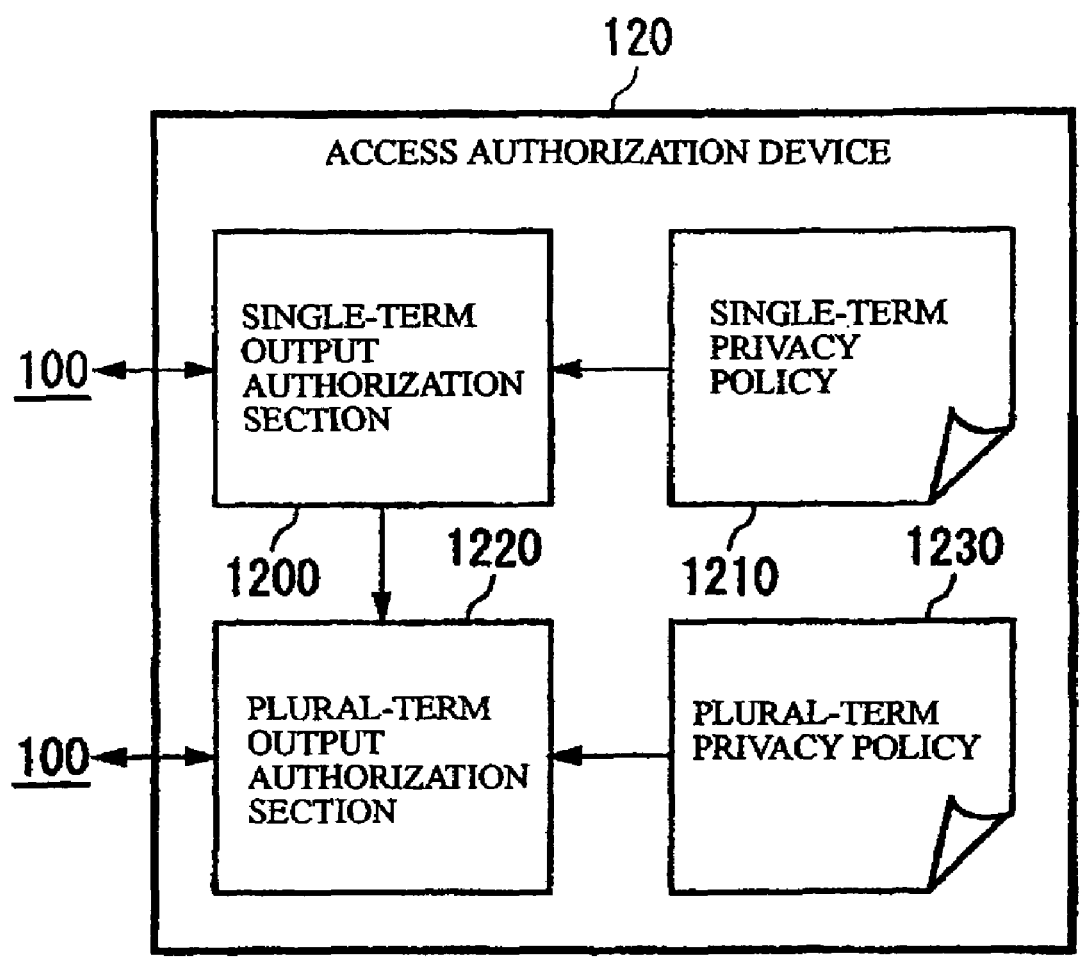
FIG. 12 is a functional block diagram of access authorization device 120.

FIG. 12 is a functional block diagram of the access authorization device 120. The access authorization device 120 has a single-term output authorization section 1200 and a plural-term output authorization section 1220. The single-term output authorization section 1200 receives a list of access-object columns from the access request device 100. The single-term output authorization section 1200 then determines, only with respect to the information classified into PII for example, whether or not output of the information should be permitted. More specifically, the single-term output authorization section 1200 determines whether or not output of each of the information items constituting the output information should be permitted according to whether or not access to the information satisfies a condition determined by a single-term privacy policy 1210. More specifically, the single-term output authorization section 1200 may determine whether or not output of the information should be permitted according to a condition which is a combination of the user of the database, data providers, the kinds of information to be used, purposes of use of information, etc., and which is determined in accordance with the single-term privacy policy 1210.

The plural-term output authorization section 1220 receives the list of access-object columns from the access request device 100. The plural-term output authorization section 1220 further determines, on the basis of a plural-term privacy policy 1230, information to be permitted to be output through the output section 470 in the output information permitted by the single-term output authorization section 1200 to be output. That is, if information is not permitted by the plural-term output authorization section 1220 to be output, the output section 470 cannot output the information even in a case where the information is permitted by the single-term output authorization section 1200 to be output. For example, the plural-term output authorization section 1220 prohibits output of information formed by combining open information and secret information, and permits output of information formed by using secret information while using no open information. Further, the plural-term output authorization section 1220 permits output of open information if output of the open information is permitted by the single-term output authorization section 1200.

More specifically, the plural-term output authorization section 1220 prohibits output of information simultaneously obtained by relating PII and PSI having the same key columns to each other in the database 200. For example, output of information obtained by relating the name of an employee and the annual income of the employee to each other is prohibited. The plural-term output authorization section 1220 also prohibits output of information provided by simultaneously obtaining a key column and PSI. "Simultaneously obtaining" may denote, for example, obtaining a certain number of times at intervals equal to or shorter than a predetermined reference interval by one application program, accessing in one transaction by one application program, or requesting output of a plurality of information items by the program describing output request 30.

Further, the plural-term output authorization section 1220 prohibits, for example, output of information formed by rearranging open information about a plurality of data providers on the basis of secret information corresponding to the open information. For example, output of information formed by rearranging the names of employees in an order determined in correspondence with the annual incomes of the employees is prohibited. The plural-term output authorization section 1220 also prohibits output of information formed by combining a plurality of secret information items related to one open information item. For example, output of information based on both the annual income and savings of one data provider is prohibited.

It is difficult to identify the data owner of PSI which is an example of secrete information unless PSI is related to PII. However, in a case where a plurality of PSI items owned by a data owner are simultaneously output, there is a possibility of the data being identified. For example, if an occupation of one data owner, a place where the data owner works, and the sex, annual income and age of the data owner are output in a state of being related to each other, it is possible to identify the data owner to whom these secret information items are related and infringement on a data owner's privacy may result as in the case of PSI being output in a state of being related to PII.

Therefore, it is preferred that the plural-item output authorization section 1220 should prohibit output of information formed by combining a number of secrete information items larger than a predetermined number while permitting output of information formed by combining a smaller number of secret information items. More preferably, the plural-item output authorization section 1220 prohibits output of output information in a case where the average of the degrees of influence of a plurality of secret information items related to one open information item is higher than a predetermined reference. In this manner, access to secret information having a low degree of information on output information may be allowed while protecting a data owner's privacy, thereby improving the convenience of use of information.

Further, the plural-term output authorization section 1220 prohibits, for example, output of information according to output request 30 if output request 30 is a request to output only open information related to secret information satisfying a certain predetermined condition. For example, output of information formed by selecting only the names of employees whose incomes are equal to or higher than a predetermined reference is prohibited. In this manner, output of information from which secret information can be imagined can be prohibited.

In a case where information input to a function column includes information prohibited by the single-term permission section 1200 or the plural-term permission section 1220, the plural-term output authorization section 1220 prohibits output of information from the function column. Further, in a case where the plural-term permission section 1220 uses, for conditional decision, information prohibited by the single-term permission section 1200 or the plural-term permission section 1220 from being output, it prohibits output of output information based on the condition if, for example, the prohibited information is included in a particular portion of the output according to output request 30.

FIG. 13 shows the results of evaluation made by the access authorization device 120 as to permission/prohibition of output of information. The single-term permission section 1200 permits output of the names of employees since the employee's name column (ID2) does not corresponds to information prohibited by the single-term privacy policy 1210. The plural-term permission section 1220 permits output of the initials of employees since the input to the employee's initial column (ID3) is only ID4 other than the objects on which output permission decision is to be made.

On the other hand, since the degree of each of the employees savings (ID8) and incomes (ID9) is equal to or higher than the predetermined reference 6 and these sorts of information are simultaneously obtained, the plural-term permission section 1220 prohibits output of information formed by using the ID8 and ID9 columns. More specifically, the plural-term permission section 1220 prohibits output of information formed by using the ID7 column to which information in the ID8 and ID9 columns are input.

Figure 14:
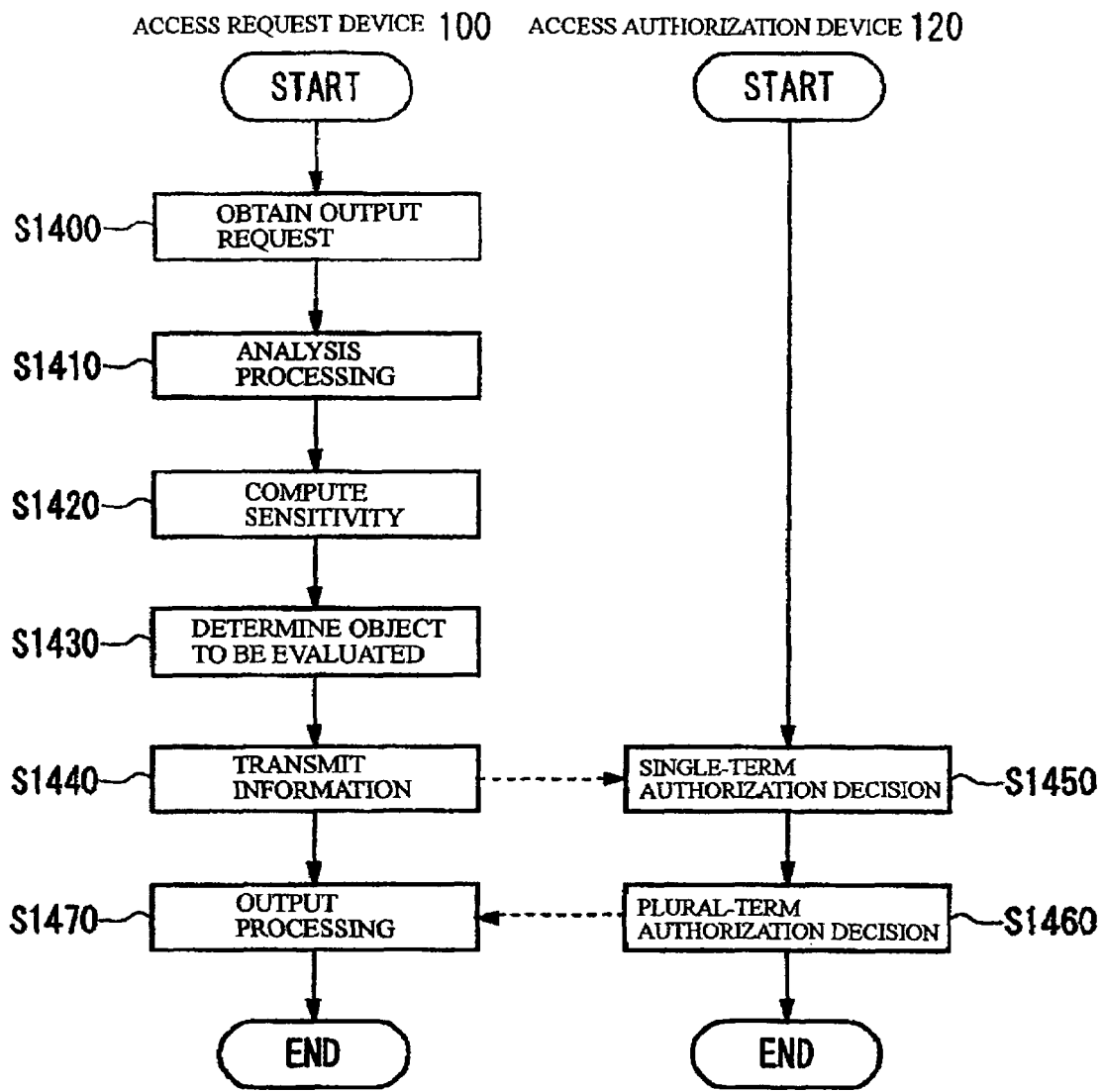
FIG. 14 is a flowchart of the operation of access control system 10.

FIG. 14 is a flowchart of the operation of the access control system 10. The output request acquisition section 410 obtains output request 30 from the application program 50 (S1400). The output request acquisition section 410 then divides each search request in the obtained output request 30 into an output portion indicating information requested to be output, an output determination portion indicating a condition for selection of an output, and a sequence designation portion indicating an output sequence.

Subsequently, the sensitivity computation section 420 analyzes output request 30 in order to compute the sensitivity of secret information and open information of data providers with respect to the generation of output information (S1410). More specifically, the sensitivity computation section 420 detects a pair of columns in a mutually identical relationship and a pair of columns in an influential relationship with respect to each of columns requested to be output according to output request 30. The sensitivity computation section 420 also performs, by using a DB schema 415, analysis as to which column in the database 200 corresponds to each of columns required to be accessed according to output request 30.

The sensitivity computation section 420 computes on the basis of a sensitivity computation rule 425 the sensitivity to which each column influences the generation of output information (S1420). More specifically, in a case where output information includes secret information or open information, the sensitivity computation section 420 computes a higher sensitivity in comparison with a case where a conditional decision made to select output information from the database 200 includes secret information or open information. Also, in a case where output information includes secret information or open information, the sensitivity computation section 420 computes a higher sensitivity in comparison with a case where secret information or open information is used as a condition for rearrangement of the output sequence of output information.

The decision object determination section 440 selects, among the columns the degrees of influence of which have been computed by the sensitivity computation section 420, an object on which decision is made by the access authorization device 120 to permit access (S1430). More specifically, the decision object determination section 440 first classifies the columns into open information, secret information and other sorts of information by using column classification data 445. Subsequently, the decision object determination section 440 selects the columns having degrees of influence equal to or higher than a predetermined reference as objects on which decision is made by the access authorization device 120 to permit access.

The information transmission section 460 transmits to the access authorization device 120 the groups of columns selected by the decision object determination section 440 and having degrees of influence equal to or higher than the predetermined reference (S1440). The single-term output authorization section 1200 receives a list of access-object columns from the access request device 100 and determines, only with respect to the information classified into PII for example, whether or not output of the information should be permitted (S1450).

Subsequently, the plural-term output authorization section 1220 determines, on the basis of a plural-term privacy policy 1230, information to be permitted to be output in the output information requested to be output according to output request 30 (S1460). For example, the plural-term authorization section 1220 prohibits output of information formed by combining open information and secret information, and permits output of information formed by using secret information while using no open information. In a case where information input to a function column includes information prohibited by the single-term permission section 1200 or the plural-term permission section 1220, the plural-term output authorization section 1220 may prohibit output of information from the function column.

The output section 470 obtains from the database 200 the information permitted by the access authorization device 120 to be output in the output information requested to be output according to output request 30, and outputs the obtained information to the application program 50 (S1470). For example, the output section 470 outputs only information in the columns permitted to be accessed in the output designation portion of output request 30.

In another case where the output portion of output request 30 includes open information while the sequence designation portion of output request 30 includes, and where output of the open information itself is permitted while output of information formed by rearranging the open information on the basis of secret information is prohibited, the output section 470 outputs the open information by arranging in a sequence different from the sequence in which the open information is rearranged on the basis of the secret information. For example, with respect to an output request to rearrange names of employees in correspondence with the annual incomes of the employees, the output section 470 outputs the names in a sequence different from the sequence in which the names are rearranged according to the incomes even if output of the names is permitted. It is preferred that in a case where output of information formed by rearranging open information on the basis of secret information is prohibited, the output section 470 should output the open information by randomly rearranging the open information, thereby making it difficult to infer the correspondence between the open information and the secret information. In this manner, a data provider's privacy can be suitably protected.

Figure 15:
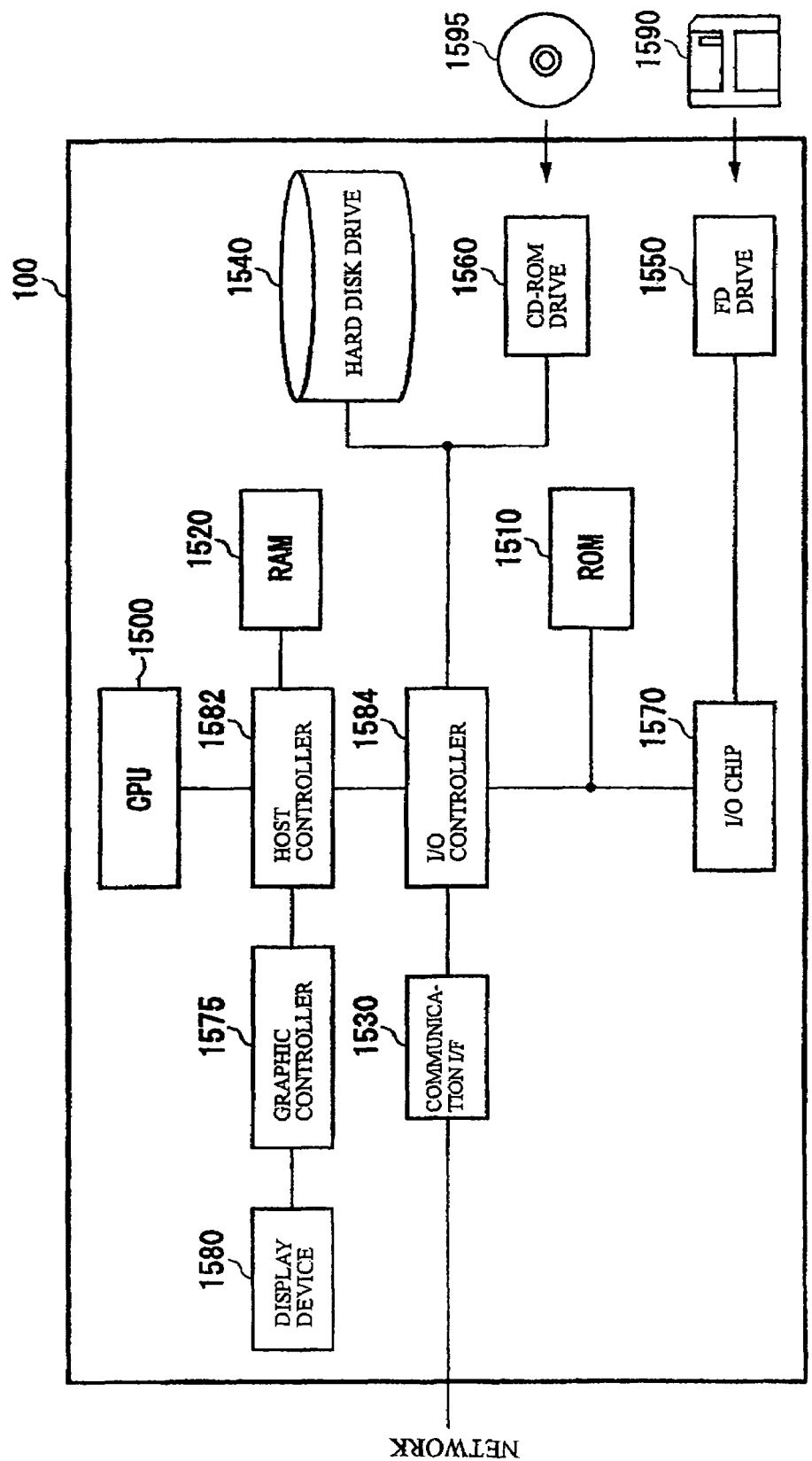
FIG. 15 shows an example of a hardware configuration of a computer which functions as access request device 100.

FIG. 15 shows an example of a hardware configuration of a computer which functions as the access request device 100. The access request device 100 has a CPU peripheral section having a CPU 1500, a RAM 1520, a graphic controller 1575 and a display device 1580 connected to each other by a host controller 1582, an input/output section having a communication interface 1530, a hard disk drive 1540 and a CD-ROM drive 1560 connected to the host controller 1582 by an input/output controller 1584, and a legacy input/output section having a BIOS 1510, a flexible disk drive 1550 and an input/output chip 1570 connected to the input/output controller 1584.

The host controller 1582 connects the RAM 1520, and the CPU 1500 and the graphic controller 1575, which access the RAM 1520 at a high transfer rate. The CPU 1500 operates on the basis of programs stored in the BIOS 1510 and the RAM 1520, and controls each component. The graphic controller 1575 obtains image data generated by the CPU 1500, etc., on a frame buffer provided in the RAM 1520, and displays the image data on the display device 1580. Alternatively, the graphic controller 1575 includes therein a frame buffer for storing image data generated by the CPU 1500, etc.

The input/output controller 1584 connects the host controller 1582, the communication interface 1530, which is an input/output device of a comparatively high speed, the hard disk drive 1540 and the CD-ROM drive 1560. The communication interface 1530 performs communication with other units through a network. The hard disk drive 1540 stores programs and data used by the access request device 100. The CD-ROM drive 1560 reads a program or data from a CD-ROM 1595 and provides the read program or data to the input/output chip 1570 via the RAM 1520.

To the input/output controller 1584 are also connected the BIOS 1510 and input/output devices of a comparatively low speed, i.e., the flexible disk drive 1550 and the input/output chip 1570 or the like. The BIOS 1510 stores a boot program executed by the CPU 1500 at the time of startup of the access request device 100, and programs, etc., dependent on the hardware of the access request device 100. The flexible disk drive 1550 reads a program or data from a flexible disk 1590 and provides the read program or data to the input/output chip 1570 via the RAM 1520. The input/output chip 1570 connects the flexible disk 1590 and various input/output devices, for example, through a parallel port, a serial port, a keyboard port, a mouse port, etc.

A program provided to the access request device 100 is provided by a user in a state of being stored on a recording medium, such as the flexible disk 1590, the CD-ROM 1595, or an IC card. The program is read out from the recording medium, installed in the access request device 100 via the input/output chip 1570 and/or the input/output controller 1584, and executed in the access request device 100.

A program installed and executed in the access request device 100 includes an output request acquisition module, a sensitivity computation module, a decision object determination module, an information transmission module and an output module. This program may use DB schema 415, sensitivity computation rule 425, column classification data 445 and sensitivity threshold value data 455 by storing these in the hard disk drive 1540. Further, the program obtained by the access request device 100 may be transmitted to the access authorization device 120 via the network and installed the access authorization device 120 to be executed.

This program includes a single-term output permission module and a plural-term output permission module. This program may use single-term privacy policy 1210 and plural-term privacy policy 1230 by storing these policies in the hard disk drive 1540. Operations which the access request device 100 or the access authorization device 120 is made by the modules to perform are the same as the operations of the corresponding components the access request device 100 or the access authorization device 120 described above with reference to FIGS. 1 to 14. Therefore, description of the operations will not be repeated.

The above-described program or modules may be stored on an external storage medium. As the recording medium, an optical recording medium such as a DVD or a PD, a magneto-optic recording medium such as an MD, a tape medium, a semiconductor memory such as an IC card, or the like can be used as well the flexible disk 1590 and the CD-ROM 1595. Also, a storage device such as a hard disk or a RAM provided in a server system connected to a special-purpose communication network or the Internet may be used as the recording medium to provide the program to the access request device 100 via the network.

The access control system 10 described as this embodiment is capable of not only determination as to permission/denial of access to each column in a database but also determination as to permission/prohibition of output of information formed by combining a plurality of columns. Therefore this system can suitably protect a data provider's privacy while avoiding excessive prohibition of access to each column due to excessive privacy protection. That is, it is possible to protect a data provider's privacy while minimizing a reduction in the convenience to data users.

The present invention has been described with respect to an embodiment thereof. However, the technical scope of the present invention is not limited to the scope described in the above description of the embodiment. It is apparent to those skilled in the art that various modifications and changes can be made in the above-described embodiment. From the description in the appended claims, it is apparent that forms of the present invention obtained by making such modifications and changes are also included in the technical scope of the present invention.

According to the above-described embodiment, an access control system, an access control device, an access control method, a program and a recording medium described in the claims below can be implemented.

We claim:

1. A method of controlling access to a database having information about a plurality of data providers comprising:
   an organizing step of organizing said information in one or more columns;
   a decision object determination step of classifying said information in said database in open information and secret information; said classifying based on identifying one or more columns of said information as key columns;
   an output request acquisition step of obtaining an output request for output of information generated by accessing the database;
   a single-term output permission step of determining whether or not to output a column of said information responsive to whether or not access to said information satisfies one or more conditions determined by a single-term privacy policy;
   a plural-term output permission step of prohibiting output of information generated by combining the open information and the secret information in output information requested to be output according to the output request, and permitting output of information generated by using the secret information without using the open information; said plural-term output permission step responsive to two or more columns of said information;
   a sensitivity computation step for calculating sensitivity of said open information and said secret information, wherein said plural-term output authorization section prohibits output of the information if each of the sensitivity of the secret information and the sensitivity of the open information is higher that a predetermined reference;
   a reorganizing step for reorganizing said open information from said information in a sequence of said plurality of data providers different from a sequence of said plurality of data providers in which said open information is arranged on a basis of secret information from said information, wherein said plural-term output authorization section prohibits output of the information generated by rearranging a plurality of items of the open information on the basis of secret information corresponding to the plurality of items of the open information; and
   an output step of:
   selectively outputting information permitted to be output in the single-term output permission step, if said information is also permitted to be output in the plural-term permission step; and
   not outputting said information permitted to be output in the single-term output permission step, if said information is not permitted to be output in the plural-term permission step.

* * * * *